US009002572B2

(12) United States Patent
Lipscomb et al.

(10) Patent No.: US 9,002,572 B2
(45) **Date of Patent: *Apr. 7, 2015**

(54) DOCKED/UNDOCKED VEHICLE COMMUNICATION INTERFACE MODULE

(71) Applicant: Bosch Automotive Service Solutions LLC, Warren, MI (US)

(72) Inventors: Edward Lipscomb, Lakeville, MN (US); Manokar Chinnadurai, Owatonna, MN (US); Troy Liebl, Owatonna, MN (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/727,259

(22) Filed: Dec. 26, 2012

(65) Prior Publication Data

US 2014/0180531 A1 Jun. 26, 2014

Related U.S. Application Data

(63) Continuation of application No. 12/537,687, filed on Aug. 7, 2009, now Pat. No. 8,340,861.

(60) Provisional application No. 61/088,858, filed on Aug. 14, 2008.

(51) Int. Cl.
*G01M 17/00* (2006.01)
*G07C 5/00* (2006.01)

(52) U.S. Cl.
CPC ........................................ *G07C 5/00* (2013.01)

(58) Field of Classification Search
USPC ................. 702/77, 183; 701/29.4, 31.4, 33.2; 530/412; 370/252
See application file for complete search history.

(56) References Cited

U.S. PATENT DOCUMENTS

| | | | | |
|---|---|---|---|---|
| 4,404,639 | A | 9/1983 | McGuire et al. | |
| 5,884,202 | A | 3/1999 | Arjoman | |
| 6,693,367 | B1 | 2/2004 | Schmeisser et al. | |
| 6,789,030 | B1 * | 9/2004 | Coyle et al. | 702/77 |
| 6,988,053 | B2 | 1/2006 | Namaky | |
| 7,155,323 | B2 | 12/2006 | Ishida | |
| 7,299,122 | B2 | 11/2007 | Perkins | |
| 7,596,636 | B2 | 9/2009 | Gormley | |
| 7,642,787 | B2 | 1/2010 | Bertness et al. | |
| 7,688,074 | B2 | 3/2010 | Cox et al. | |

(Continued)

FOREIGN PATENT DOCUMENTS

| | | |
|---|---|---|
| TW | I296588 | 5/2005 |
| TW | 200602844 A | 1/2006 |

(Continued)

*Primary Examiner* — John Q Nguyen
*Assistant Examiner* — Aaron Smith
(74) *Attorney, Agent, or Firm* — Baker & Hostetler LLP

(57) ABSTRACT

A diagnostic system that includes a vehicle communication interface (VCI) and a diagnostic tool is provided. When the VCI and the diagnostic tool are coupled together through a wired connection, the VCI and the diagnostic tool can communicate with each other and provide power, as needed, to each other. The VCI and the diagnostic tool can also communicate with each other wirelessly when they are not directly coupled to each other. The VCI and the diagnostic tool are configured so that communication is uninterrupted when going from the wired connection to the wireless connection and vice versa.

21 Claims, 8 Drawing Sheets

(56) References Cited

U.S. PATENT DOCUMENTS

| | | | | |
|---|---|---|---|---|
| 7,705,602 | B2 | 4/2010 | Bertness | |
| 7,778,749 | B2 | 8/2010 | McGee et al. | |
| 7,999,505 | B2 | 8/2011 | Bertness | |
| 8,046,501 | B2 | 10/2011 | Gormley | |
| 8,199,659 | B2 * | 6/2012 | Mergler et al. | 370/252 |
| 8,209,082 | B2 | 6/2012 | Miller et al. | |
| 8,239,094 | B2 * | 8/2012 | Underdal et al. | 701/29.4 |
| 8,280,581 | B2 | 10/2012 | Keane | |
| 2003/0080621 | A1 | 5/2003 | Kirk | |
| 2003/0088346 | A1 | 5/2003 | Calkins et al. | |
| 2005/0239496 | A1 | 10/2005 | Sylvain | |
| 2007/0032927 | A1 | 2/2007 | Chinnadurai | |
| 2008/0071440 | A1 * | 3/2008 | Patel et al. | 701/29 |
| 2008/0086246 | A1 | 4/2008 | Bolt et al. | |
| 2008/0119981 | A1 | 5/2008 | Chen | |
| 2010/0029915 | A1 * | 2/2010 | Duthie et al. | 530/412 |
| 2010/0262335 | A1 | 10/2010 | Brozovich | |

FOREIGN PATENT DOCUMENTS

| | | | |
|---|---|---|---|
| TW | M332617 | U | 5/2008 |
| WO | WO 02093708 | A1 * | 11/2002 |

* cited by examiner

DOCKED/UNDOCKED VEHICLE COMMUNICATION INTERFACE MODULE

CROSS-REFERENCE TO RELATED APPLICATIONS

This application is a continuation of U.S. patent application Ser. No. 12/537,687, filed Aug. 7, 2009, which is now U.S. Pat. No. 8,340,861, issued Dec. 25, 2012, which claims priority to provisional U.S. patent application entitled, "Docked/Undocked Vehicle Communication Interface Module," filed Aug. 14, 2008, having Ser. No. 61/088,858 the disclosures of which are hereby incorporated by reference in their entirety.

FIELD OF THE INVENTION

The present invention relates generally to a vehicle diagnostic tool. More particularly, the present invention relates to docking and undocking a vehicle diagnostic tool with a vehicle communication interface.

BACKGROUND OF THE INVENTION

Vehicle diagnostic scan tools are used to diagnose issues in the vehicle under test. The scan tools are built with increasing capabilities that include larger color screens that are capable of being read in direct sunlight, and internet and networking capabilities. The scan tool can be directly linked to a vehicle's data link connector (DLC) in order to communicate with the vehicle's on-board diagnostic system, such as OBD-II (On Board Diagnostic). Once the scan tool is connected to the DLC it can draw power from the vehicle's battery. However, depending on the usage, the scan tool can draw too much power from the vehicle's battery and can damage or drain the vehicle's battery. Additionally, the scan tool can be equipped with its own internal power supply (battery), however, by using the scan tool's internal power supply, the amount of time that a technician can use the scan tool is limited.

Vehicle communication interface (VCI) can also be used to connect to the DLC of the vehicle and communicate with the vehicle's on-board diagnostic system. The VCI can provide diagnostic data to the scan tool or to a remote computing device.

Accordingly, it is desirable to provide a system and method that power balances the scan tool's draw of power between a vehicle, the scan tool's battery and any other available power source. It is also desirable to provide a diagnostic tool that can communicate with the VCI via a wireless or wired connection.

SUMMARY OF THE INVENTION

A method and apparatus are provided to allow a VCI to communicate with a scan tool via a wired or wireless connection. If the scan tool and the VCI moves from a wireless to a wired connection or vice versa, the communication will remain uninterrupted.

In accordance with one embodiment of the present invention, a portable diagnostic tool system for a vehicle is provided, which can include a vehicle communication interface (VCI) configured to communicate with a data link connector on the vehicle and to receive diagnostic data from the vehicle, and a diagnostic tool configured to receive diagnostic data from the VCI via a wired or a wireless connection, wherein when in the wired connection the diagnostic tool and the VCI are configured to provide power to each other and communicate with each other through the wired connection, wherein when the diagnostic tool and the VCI are disconnected from the wired connection, the diagnostic tool and the VCI is configured to communicate with each other wirelessly without having to reboot the diagnostic tool or the VCI.

In accordance with another embodiment of the present invention, a vehicle communication interface (VCI) that links with a vehicle to collect vehicle diagnostic data is provided, which can include a processor that processes the vehicle diagnostic data, a signal translator that translates a vehicle communication protocol, a memory that stores the vehicle diagnostic data, a wireless communication interface configured to allow wireless communication with a diagnostic tool, a first connector that connects to a data link connector on the vehicle to receive the vehicle diagnostic data, and a second connector that allows the VCI to connect to the diagnostic tool, wherein when the VCI is connected to and communicating with the diagnostic tool via the second connector and then disconnected from diagnostic tool, the VCI will continue to communicate with the diagnostic tool via a wireless connection without rebooting the diagnostic tool or the VCI.

In accordance with yet another embodiment of the present invention, is a method of communicating between a vehicle communication interface (VCI) and a vehicle diagnostic tool which can connect the VCI with the vehicle diagnostic tool through a VCI connector interface on the vehicle diagnostic tool, receive vehicle diagnostic data from the vehicle by the VCI, communicate the vehicle diagnostic data from the VCI to the vehicle diagnostic tool, provide power as needed from the VCI to the vehicle diagnostic tool and vice versa, and maintain uninterrupted communication via a wireless connection between the VCI and the scan tool when the VCI is disconnected from the vehicle diagnostic tool.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
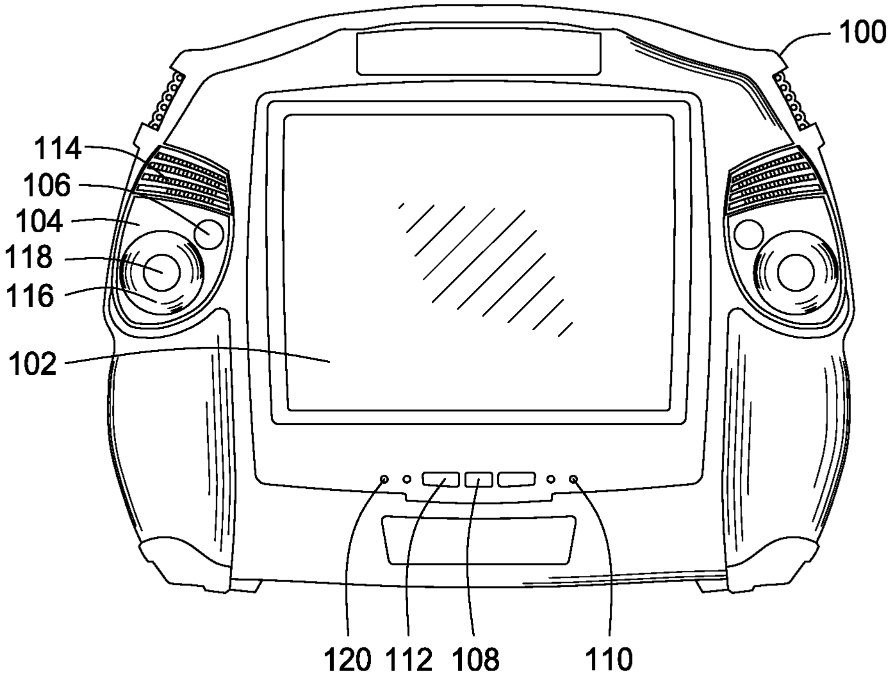
FIG. 1 illustrates a front view of a scan tool according to an embodiment of the invention.

The invention will now be described with reference to the drawing figures, in which like reference numerals refer to like parts throughout. An embodiment in accordance with the present invention provides a system and a method that allow a diagnostic tool such as a scan tool to balance the drawing of power from various power sources. In another embodiment, the scan tool can dock and undock from the VCI as needed while maintaining seamless communication with the VCI.

FIG. 1 illustrates a front view of a scan tool 100 according to an embodiment of the invention. The scan tool 100 includes a display 102, a scroll device 104, a power button 108, LED indicators 110 and function buttons 112. The display can be any type of display including LCD, VGA, OLED, SVGA and other types of displays including touch screen displays. The display may be a colored or non-colored display. The display can display information such as the make, model, year of vehicles that the scan tool can diagnose, the various diagnostic tests the scan tool can run, diagnostic data the scan tool has received, the baseline data of the various components in a vehicle and information from remote servers (internet, database information, etc). Additionally, the display can show videos for the user to view and the accompanying audio can be heard via the built in speakers 114. The speakers can be a single speaker or multiple speakers for stereo sound. In one embodiment, the display allows the user to input selection through the touch screen for interactive navigation and selection, wherein the technician can select a menu item by touching the selection on the screen.

The scroll device 104 can be used to scroll through information or menus on the display, such as vehicle information or available diagnostic tests. In one embodiment, there is one scroll device 104 and in another embodiment there are two or more scroll devices 104. When two scroll devices 104 are present, the user can have dual controls of the menus or the selections on the display. By having two scroll devices, it will be easier for a technician to use the scan tool regardless if he was left-handed or right-handed. The scroll device includes an "enter" button 118 so that user can select the menu item, for example, a vehicle make or a diagnostic test to run. The scroll device 104 also includes a scroll wheel 116 that can rotate around the "enter" button 118. The scroll wheel 116 also includes up, down, left and right arrow controls. The scroll wheel 116 allows the technician to move an indicator on the screen so that the information, such as menus can be scrolled and a selection on the screen can be made. The scroll wheel 116 is configured for a fast response or fast scrolling. The scroll device 104 also includes a scroll button 106, such as an "esc" button or any other button desired by the technician, such as a "back" or "forward" button. The scroll button 106 including any components of the scroll device 104 can be programmed for any desired functionality.

The face of the scan tool 100 includes the power button 108 that allows the technician to power "on" and "off" the scan tool 100. The power button 108 can also be used to put the scan tool 100 into a standby mode in order to save battery power when not in use. Also on the face of the scan tool are LEDs to indicate various status of the functionality of the scan tools, such as wireless connectivity or network connectivity, low battery and any other indicators desired by the technician. The face of the scan tool further includes function buttons 112 that when pressed allows a user to perform a specified function such as controlling the brightness of the display, volume of the speakers or any other function desired by the technician. A microphone 120 allows the technician to record information such as the noise being made by the vehicle for later analysis or for comparison with stored data. Further, the technician can also record comments or notes during the testing for later retrieval and analysis.

Figure 2:
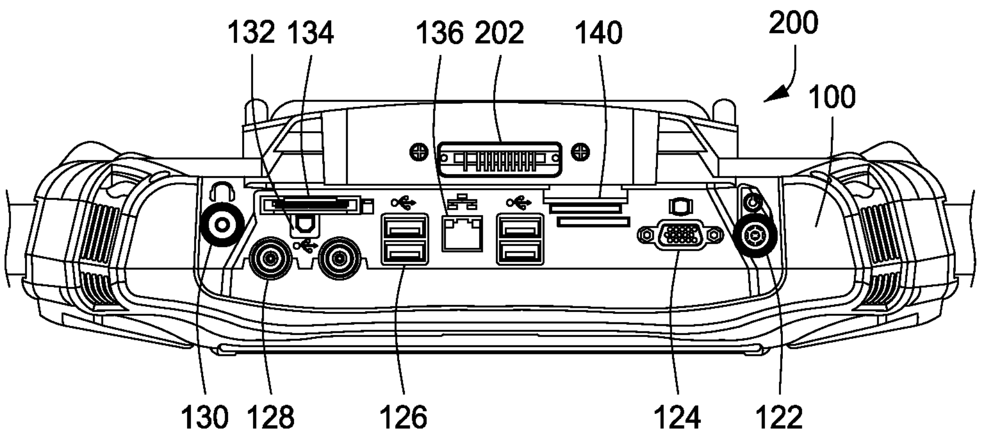
FIG. 2 is an upper view of the scan tool coupled to an optional vehicle communication interface (VCI) according to an embodiment of the invention.

FIG. 2 is an upper view of the scan tool 100 coupled to an optional vehicle communication interface (VCI) 200 according to an embodiment of the invention. Turning to the connections available on the scan tool 100, the scan tool can be connected to an A/C power source via the A/C power connector 122. The A/C powers the scan tool and recharges the scan tool's internal battery (not shown). A VGA video connector 124 allows the information on the scan tool 100 to be displayed on an external display, such as a display on a personal computer. Other display connector types can include HDMI for better graphics and sound.

A series of host USB (universal serial bus) connectors 126 are available to couple additional devices to the scan tool 100. In one embodiment, there are four connectors, but more or less connectors are contemplated by the invention. Additional devices can add functionality to the scan tool or allow the scan tool 100 to add functionality to another device, such as the VCI 200. The functionality can include communications, printing, memory storage, video and other functionality. A two-channel scope connection 128 allows for a scope to be connected to the scan tool 100. The scope allows for various measurement of signals such as volts, ohms, dwell, duty cycle, peak to peak, peak volts, injector pulse width, injector on time, firing kV, burn kV, burn voltage and other measurement of signals.

A stereo headphone connection 130 allows the technician to add a headphone to the scan tool 100. A USB device slot 132 also adds functionality to the scan tool by another device or adds functionality of the scan tool to another device. An express card slot 134 is provided to add functionality, such as a wireless modem, memory, TV tuner, networking, mouse, remote control and other functionalities to the scan tool 100. An Ethernet connector 136 allows for network connection with the scan tool 100 in order to transfer data to and from the scan tool to a remote device such as a server or personal computer. SDIO (Secure Digital Input Output) 140 cards slots are provided on the scan tool 100 to provide still additional functionality such as GPS receivers, Wi-Fi or Bluetooth adapters, modems, Ethernet adapters, barcode readers, IrDA adapters, FM radio tuners, TV tuners, RFID readers, and mass storage media such as hard drives and flash drives. The connections are not limited to what are shown in FIG. 2, but additional connectors are contemplated such as Firewire, HDMI, and serial connections.

When the VCI 200 is docked with the scan tool 100, the VCI will be the device that is connected to the vehicle's DLC for diagnosis. A vehicle connector 202 on the VCI along with a data line (not shown) allows the VCI to connect to the vehicle's DLC and exchange diagnostic data and to receive power from the vehicle.

Figure 3:
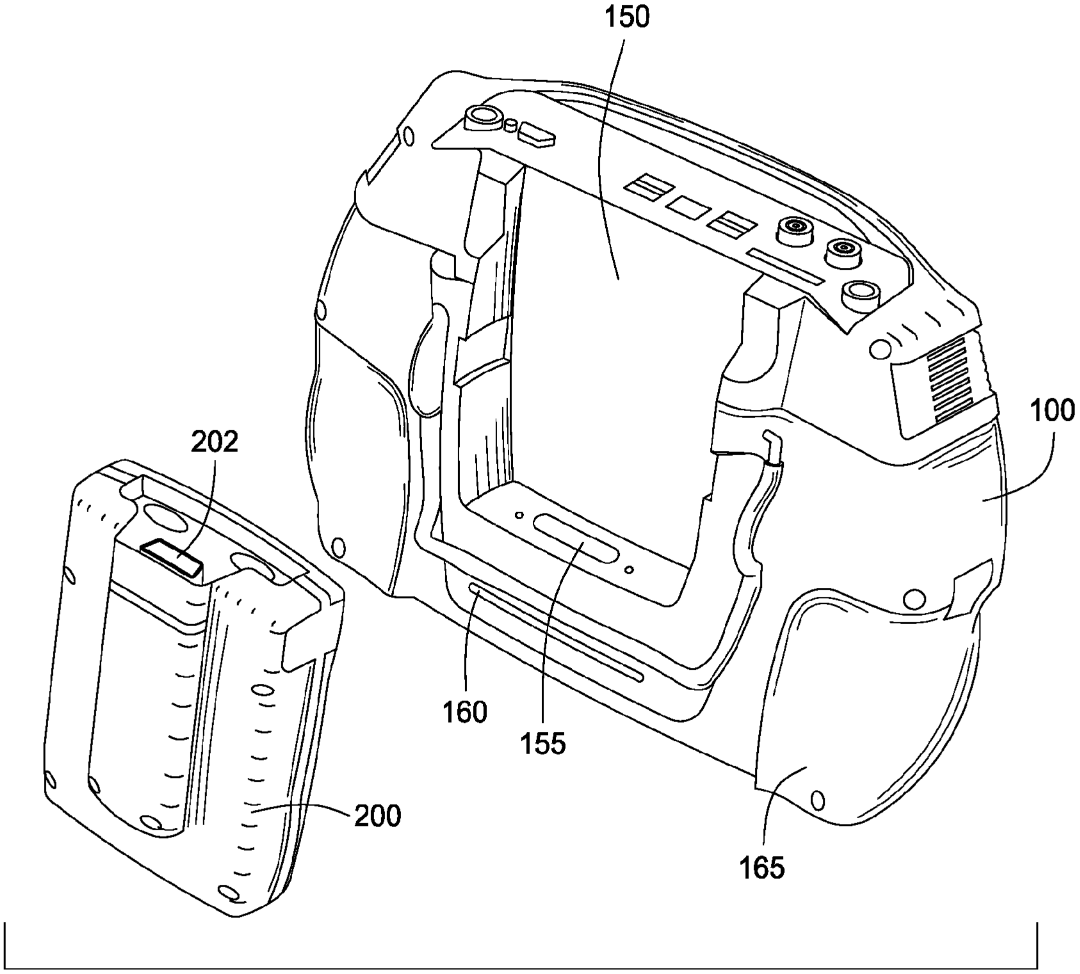
FIG. 3 illustrates a perspective view of the scan tool and the VCI uncoupled according to an embodiment of the invention.

FIG. 3 illustrates a perspective view of the scan tool 100 and the VCI 200 uncoupled according to an embodiment of the invention. FIG. 3 illustrates a back view of the scan tool 100, wherein a VCI receiving portion 150 is constructed to receive the VCI 200. A VCI connector 155 allows the VCI 200 to connect with the scan tool 100 via a wired connection. Once connected, the VCI 200 and the scan tool 100 can communicate with each other. Additionally, the VCI 200 and the scan tool 100 can provide power to each other as needed through the VCI connector 155. A grip portion 165 is provided on each side of the scan tool 100. The grip portion 165 can be made of any material including an elastomeric material. A handle 160 is provided on the back side of the scan tool in order for the technician to move the scan tool from one place to another. Additionally, the handle 160 can act as a stand so that the user can have a desired viewing angle.

Figure 4:
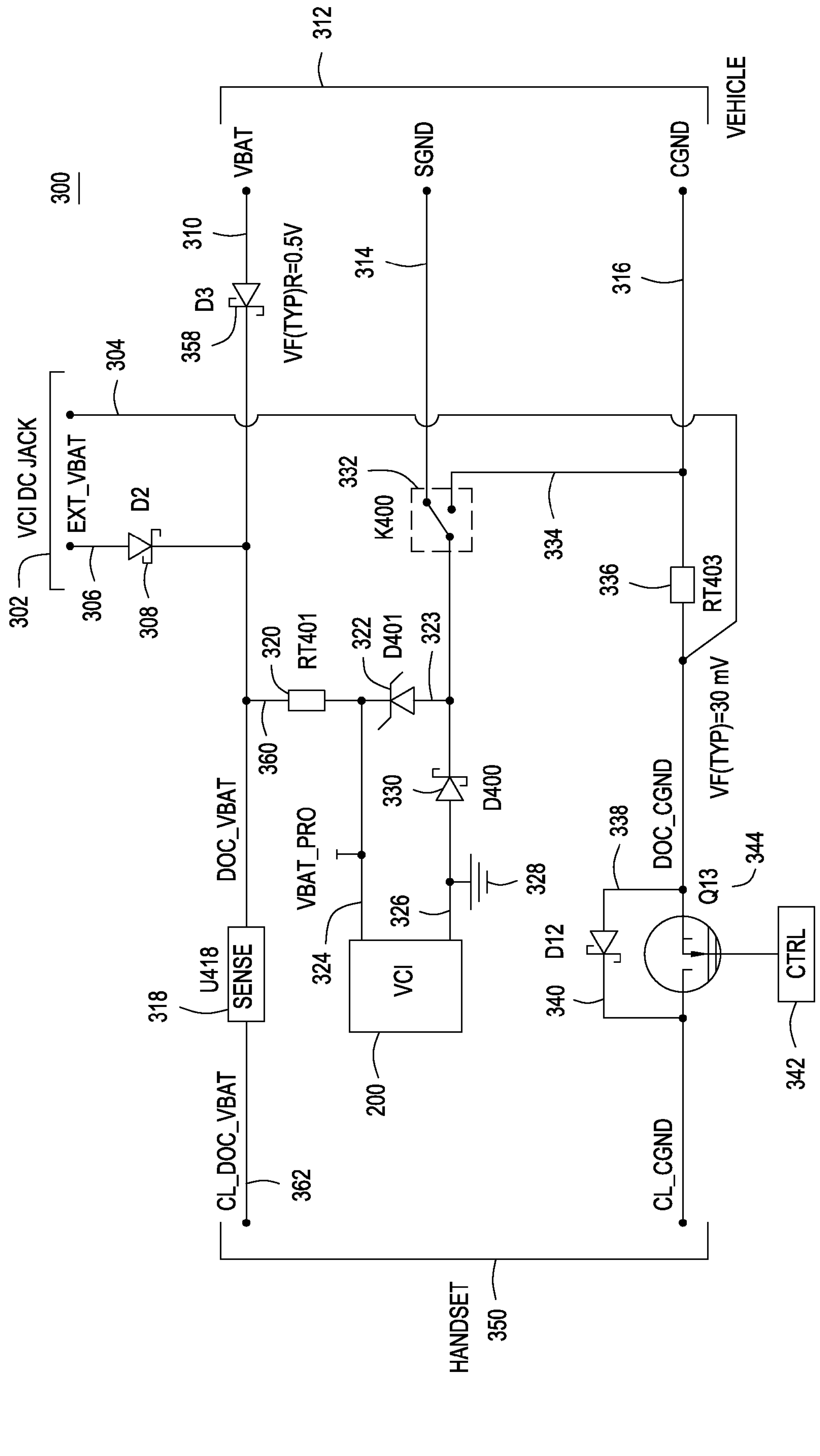
FIG. 4 illustrates an example electrical schematic diagram of a power balancing system according to an embodiment of the invention.

FIG. 4 illustrates an example electrical schematic diagram for a power balancing system 300 according to an embodiment of the invention. The VCI 200 can be powered via a DC jack 302, which can accept a connection from an external battery or other electrical power source. In some embodiments, the VCI 200 can be powered via an optional AC jack and appropriate power conversion circuitry (not shown).

In one embodiment of the invention, the electrical ground for the DC jack 302 is connected to the chassis ground of the vehicle 312, first through electrical node 304 (DOC_CGND), next through the current-limiting resistor or equivalent protection device 336 (RT403), then through electrical node 316 (CGND) which is physically connected to the vehicle 312 using the Vehicle Cable Connector 202 (FIG. 2 and FIG. 3). The current-limiting resistor or equivalent protection device 336 (RT403) may be any type of resistor or resistance circuit including a thermistor, or it may be a fuse or any another electronic component with a similar purpose or function.

In one embodiment of the invention, the electrical power supplied through the DC jack 302 may be conveyed to the core functional elements of the VCI device 200 and to the handset device 350 (or scan tool 100) to which the VCI device 200 is docked. The core of the VCI device 200 receives power through the sequence consisting first of electrical node 306 (EXT_VBAT), next reverse current protection diode 308 (D2), then electrical node 360 (DOC_VBAT), and finally through the current-limiting resistor or equivalent protection device 320 (RT401), to electrical node 324 (VBAT_PRO). The current-limiting resistor or equivalent protection device 320 (RT401) may be of any type of resistor, or alternatively it may be a fuse or any another electronic component with a similar purpose or function. The core of the VCI device 200 is protected from overvoltage by protection diode 322 (D401), which may be a transient voltage suppression (TVS) diode or equivalent. Also, the core of the VCI device 200 may be protected by optional reverse current protection diode 330 (D400).

Similarly, the handset 350 can also receive the electrical power made available on electrical node 360 (DOC_VBAT). This is achieved through the current sensing circuit 318 (U418) and electrical node 362 (CL_DOC_VBAT), which is included within the VCI Docking Connector 155 (FIG. 3).

Additionally, capability is provided for electrical power to be supplied to the VCI device and the Handset 350 by the existing battery or other power source typically included within the vehicle 312. This is accomplished through an electrical connection within the Vehicle Cable Connector 202 (FIG. 2 and FIG. 3) that joins the non-grounded terminal (not shown) of the battery within vehicle 312 to electrical node 310 (VBAT), which then connects through diode 358 (D3), providing electrical power to electrical node 360 (DOC_VBAT). The power is then conveyed as described above.

In various embodiments of the invention, the handset device 350 also contains one or more of its own power sources, which may include an internal battery (not shown), the handset's A/C Power Connector 122 (FIG. 2), power sourced from the handset's USB Device Slot 132 (FIG. 2), or other power sources not shown. Embodiments of handset 350 with multiple power sources are capable of selecting one or more of the most appropriate power sources for a given situation, which typically would involve selecting a power source in good working order, prioritizing the use of power from electrical node 362 (CL_DOC_VBAT), and switching to an alternative power source if power from electrical node 362 is interrupted.

The connection between electrical node 362 and the handset 350, along with the presence of other power sources within handset 350, could result, under certain particular circumstances, in the reverse flow electrical power from that described above, that is, from one or more power sources within the handset device 350, then through the VCI Docking Connector 155 (FIG. 3), through electrical node 362 (CL_DOC_VBAT), and into electrical node 360 (DOC_VBAT). This situation would allow the core of the VCI 200 to be powered by the handset 350, which would be beneficial when no power is available either from the DC jack 302 or from the battery within the vehicle 312. Various embodiments of the invention may be configured to prevent, allow, or otherwise control this reversed power flow, such as through the use of diodes within the handset device 350, and some embodiments may include other manners of managing, controlling, switching on and off, and selecting other characteristics of reversed power flow if and when allowed to occur.

An embodiment of the invention reconfigures diode 358 (D3) with other additional and/or replacement components to permit power to flow through electrical node 310, in the opposite direction from that described above, into vehicle 312, such as to charge the battery typically contained within vehicle 312 through the use of one or more of the other power sources available to the invention.

Line 326 also includes a switch 332 that switches from a first position to a second position depending on the power source being utilized so that in some embodiments, the ground utilized by the system can be SGND (signal ground) along line 314 or CGND (chassis ground) along line 316. In one embodiment, the default is SGND. Line 334 connects to the switch 332 at one end and at the other end to line 316. Line 316 on one end includes the CGND (chassis ground) in the vehicle and at the other end includes CL_CGND.

Line 316 includes by-pass line 338 that includes diode 340 (D12). A controller switch 342 is a type of electronic switch that is off when the handset 350 draws too much power from the VBat of the vehicle and is on to allow the handset to draw power from the VBat when the handset is not drawing too much power. The controller switch 342 can be controlled by the CPLD (not shown) within the VCI. The CPLD also communicates with the sense 318 on line 310 to sense the current being drawn by the handset. The CPLD uses the sense 318 in conjunction with the controller switch 342 in order for the system to operate on a duty cycle according to one embodiment of the invention. Thus, the system monitors the current being drawn from the vehicle's battery by the scan tool and if the current being drawn exceeds a predetermined amount, such as, for example, 4-6 amps, then the current monitoring system cuts power to the scan tool so that the scan tool uses its own battery source. After a predetermined period of time, the current monitoring system enables power from the vehicle to the scan tool so that the scan tool's battery is not being used at all times. The current monitoring system continues this monitoring process when the scan tool is connected to the VCI or in other embodiments directly with the vehicle.

Figure 5:
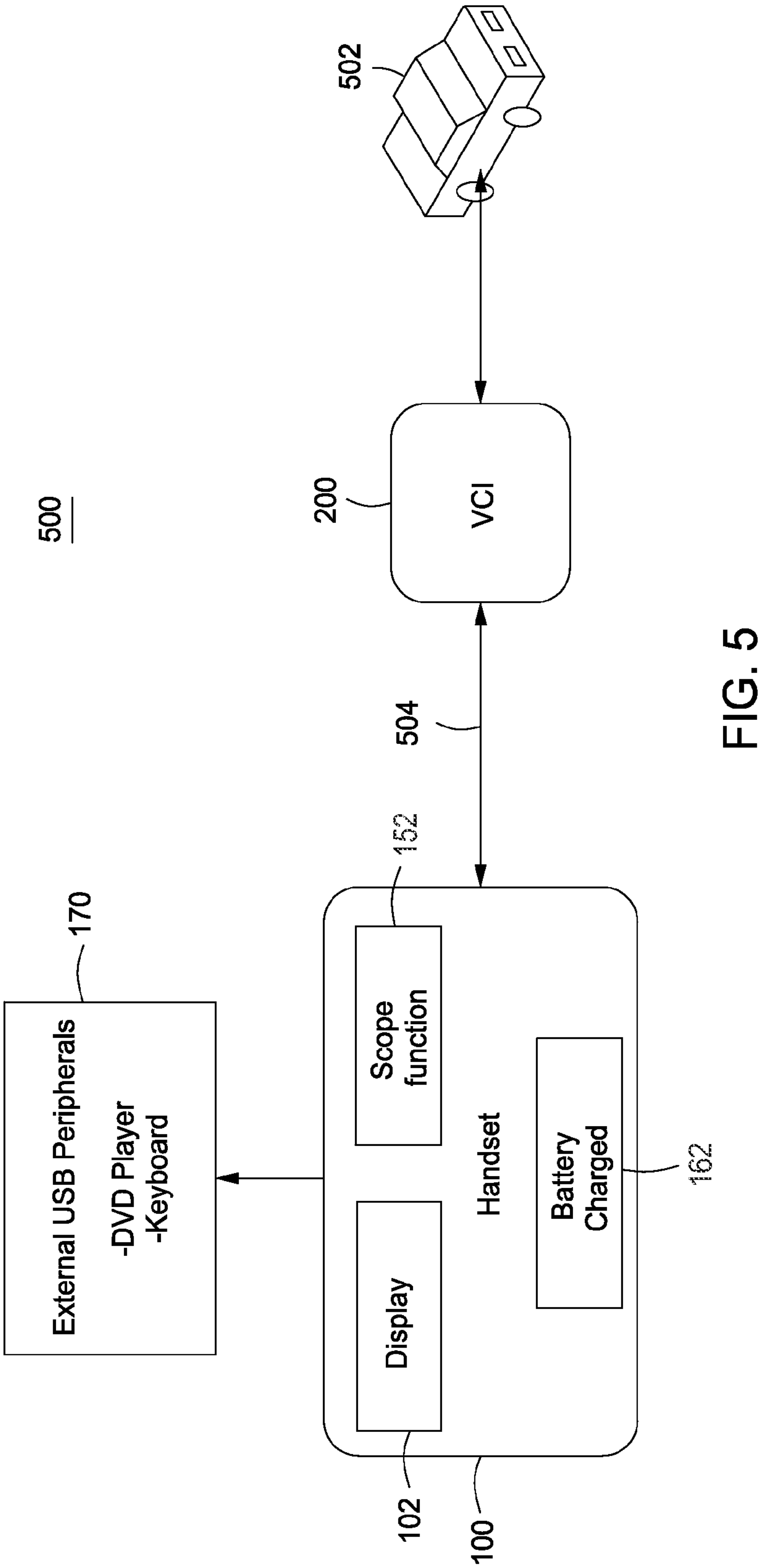
FIG. 5 illustrates a wired connection between the VCI and the scan tool according to an embodiment of the invention.

FIG. 5 illustrates a wired connection between the VCI 200 and the scan tool 100 according to an embodiment of the invention. The VCI 200 is connected to a vehicle 502 via a wired connection with the vehicle's DLC. With the VCI 200 wired to the vehicle, the VCI can receive power from the vehicle's battery. As previously discussed, the VCI 200 can also receive power from an AC adapter or directly from the vehicle's battery. Thus, the VCI 200 can operate at maximum power and with all functionality (wireless, Ethernet, USB, colored display, etc.). With the VCI 200 connected, the scan tool 100 can also be connected to the VCI via direct coupling as shown above, via USB, via Ethernet or other wired connections 504. When the scan tool 100 is connected to the VCI 200 via a wired or hard connection, then the scan tool can also receive power from the VCI's battery or from the vehicle's battery. With the scan tool 100 powered by the vehicle, the scan tool's battery 162 can be charged and the display 102 can fully function in colored mode. In one embodiment, the display 102 on the scan tool 100 can switch from full color to less color or to monochrome in order to conserve power or its own battery 162. With the wired connection to the VCI 200, the scan tool 100 can also run the full range of diagnostic applications, such as a scope function 152. Additionally, the scan tool 100 can operate other devices attached to it via USB, Firewire, Ethernet and other types of connections. Examples of USB devices 170 connectable to the scan tool 100 include a keyboard or a DVD player.

In one embodiment, when the scan tool's battery is low or the battery is removed, the scan tool 100 will have enough power (back up power) to run in low power mode for about 1 minute. With this back up power and the tool in the low power mode, there is enough time to replace the battery, to add an external power source and/or to perform an auto safe shutdown. Additionally, the scan tool 100 can automatically save any diagnostic data to a memory such as a hard drive. However, the scan tool 100 will not have enough power to power any connected USB devices 170, the display or the diagnostic tests such as the scope function. In other embodiments, the backup power can range up to 5 minutes or more.

The VCI 200 when connected to the DLC can receive diagnostic data in addition to receiving power from the vehicle. The diagnostic data can be stored on the VCI 200 for later retrieval or shown on the VCI's display (if one is available). Because the scan tool 100 is connected to the VCI 200, it can receive the diagnostic data from the VCI 200 in real-time or can retrieve previously stored data in the VCI.

Figure 6:
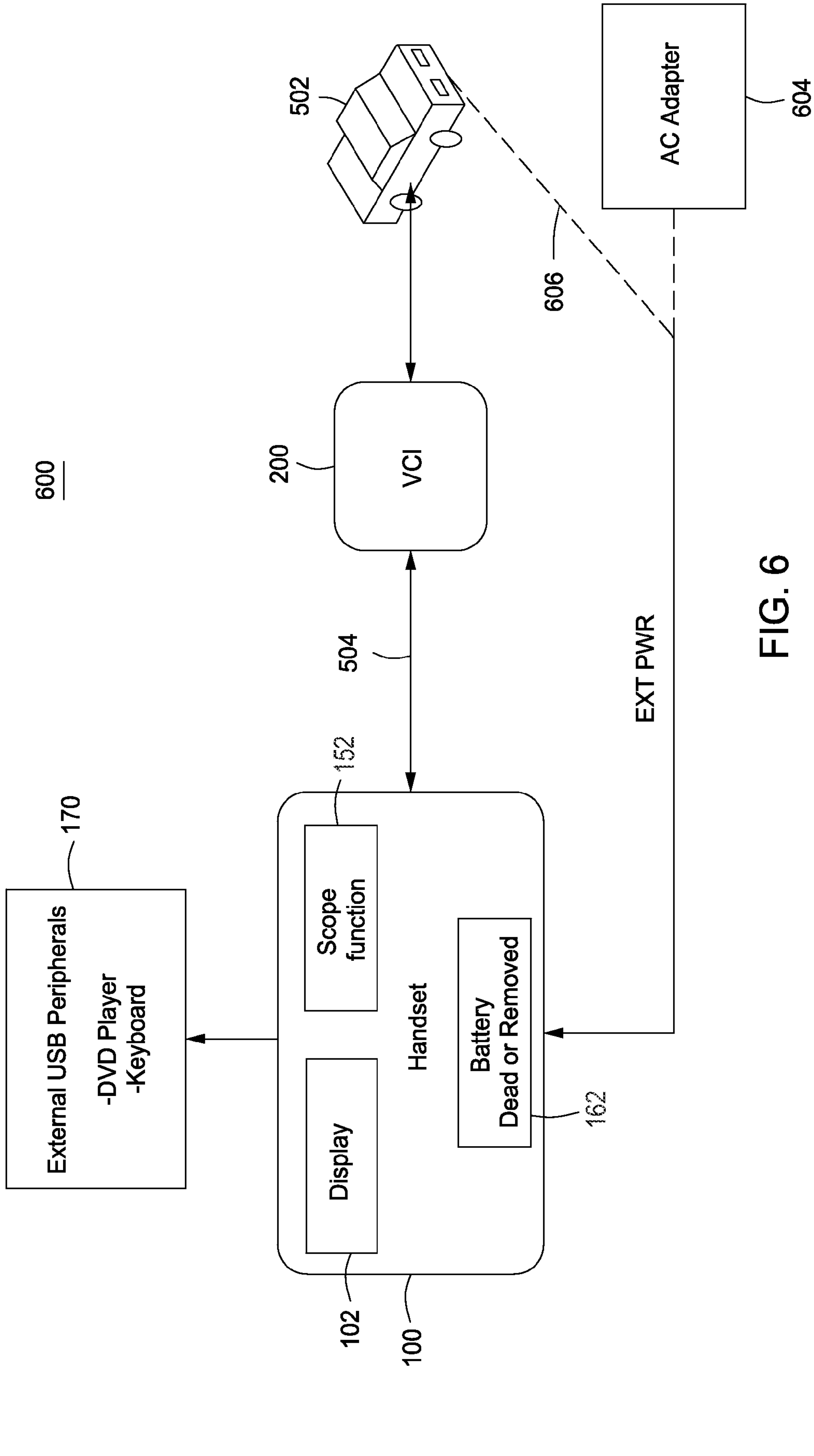
FIG. 6 illustrates a wired connection between the VCI and the scan tool including alternative power sources according to an embodiment of the invention.

FIG. 6 illustrates a wired connection between the VCI 200 and the scan tool 100 including alternative power sources according to an embodiment of the invention. Similar to FIG. 5, the scan tool 100 is connected to the VCI 200 via a wired connection 504. However, the battery 162 is dead or removed. In this embodiment, the scan tool 100 can receive power from various sources including from the VCI 200, as shown in FIG. 5 to run the scan tool 100 and/or charge the battery 162. In other embodiments, the scan tool 100 can receive power by connecting directly with the vehicle 502 via connection 606. Connection 606, for example, can be a connection to the DLC of the vehicle or via a cigarette lighter in the vehicle or a straight connection to the vehicle's battery. In another embodiment, the scan tool 100 can receive power from an AC adapter 604. The AC adapter 604 can connect to the scan tool via its AC connector 122 (FIG. 2).

Figure 7:
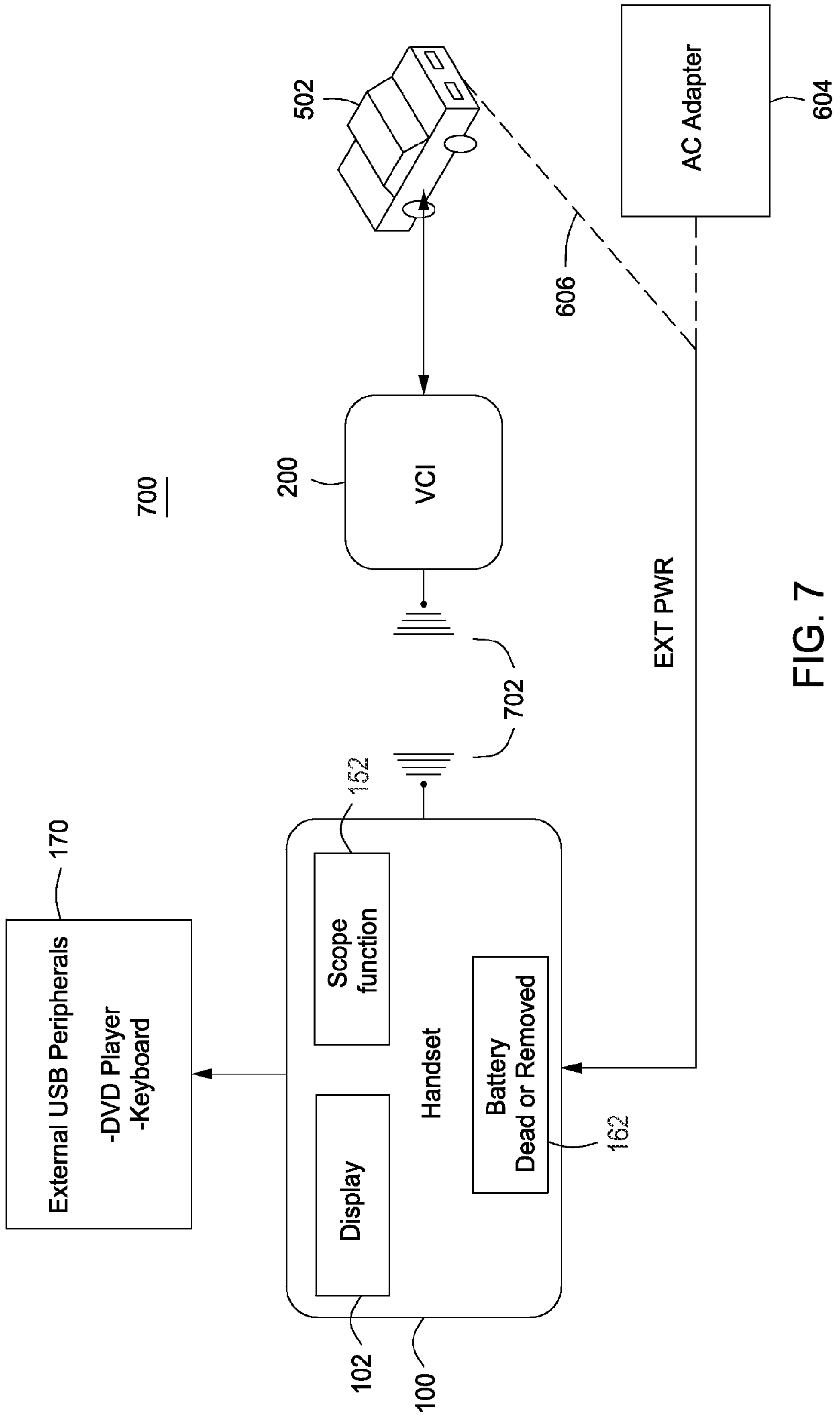
FIG. 7 illustrates the wireless communication between the scan tool and the VCI according to an embodiment of the invention

FIG. 7 illustrates the wireless communication between the scan tool 100 and the VCI 200 according to an embodiment of the invention. Similar to FIG. 6, the VCI is connected to the vehicle 502 via the DLC connection and receives power and diagnostic data from the vehicle. However, there is no wired connection between the VCI 200 and the scan tool 100. The scan tool 100 and the VCI 200 communicate via a wireless connection 702. The wireless connection 702 can be in the form of Wi-Fi, BLUETOOTH, infrared, cellular, satellite, radio frequency, and other types of wireless connections.

In this embodiment, the battery 162 is dead or removed from the scan tool and the scan tool 100 can receive power by connecting directly with the vehicle 502 via connection 606. Connection 606, for example, can be a connection to the DLC of the vehicle or via the cigarette lighter in the vehicle or a straight connection to the vehicle's battery. In another embodiment, the scan tool can receive power from the AC adapter 604. The AC adapter 604 can connect to the scan tool via its AC connector 122 (FIG. 2).

With the scan tool powered by the vehicle, the scan tool's battery 162 can be charged and the display 102 can fully function in colored mode. The scan tool 100 can also run the full range of diagnostic applications, such as the scope function 152. Additionally, the scan tool 100 can operate other devices attached to it via USB, Firewire, Ethernet and other types of connections. Examples of USB devices 170 connectable to the scan tool include a keyboard or a DVD player.

With the scan tool communicating with the VCI wirelessly, the user can be mobile in the shop area. Data can be gathered and displayed on the scan tool 100 so that the user can be working on the vehicle at the engine. Additionally, data or information can be transmitted from the scan tool 100 to the VCI 200, such as software or database updates. When the scan tool 100 is low on power, it can connect with the VCI 200 via a wired connection and receive power. Additionally, the VCI 200 can continue to provide the scan tool diagnostic data or otherwise communicate with the scan tool as if it was a wireless connection. Further, the scan tool can also provide information or data to the VCI via the wired connection. When the user is ready to uncouple the scan tool 100 from the VCI 200, the VCI recognizes that the wired connection is no longer available with the scan tool and begins to transmit or communicate with the scan tool via the wireless connection. It should be noted that going from a wireless to a wired connection and vice versa, the exchange of information between the scan tool and the VCI does not lapse and remains in real time. Both software and processors located in both the scan tool and VCI, respectively, are configured to communicate with each other (scan tool and VCI) so that communication can be conducted seamlessly whether through a wired or wireless connection. The scan tool and the VCI would also do not need to be rebooted in order to establish a wireless connection after a wired connection or a wired connection after a wireless one. Thus, no data or information will be lost when the scan tool is docked with or undocked from the VCI and the user will experience a seamless connection.

Figure 8:
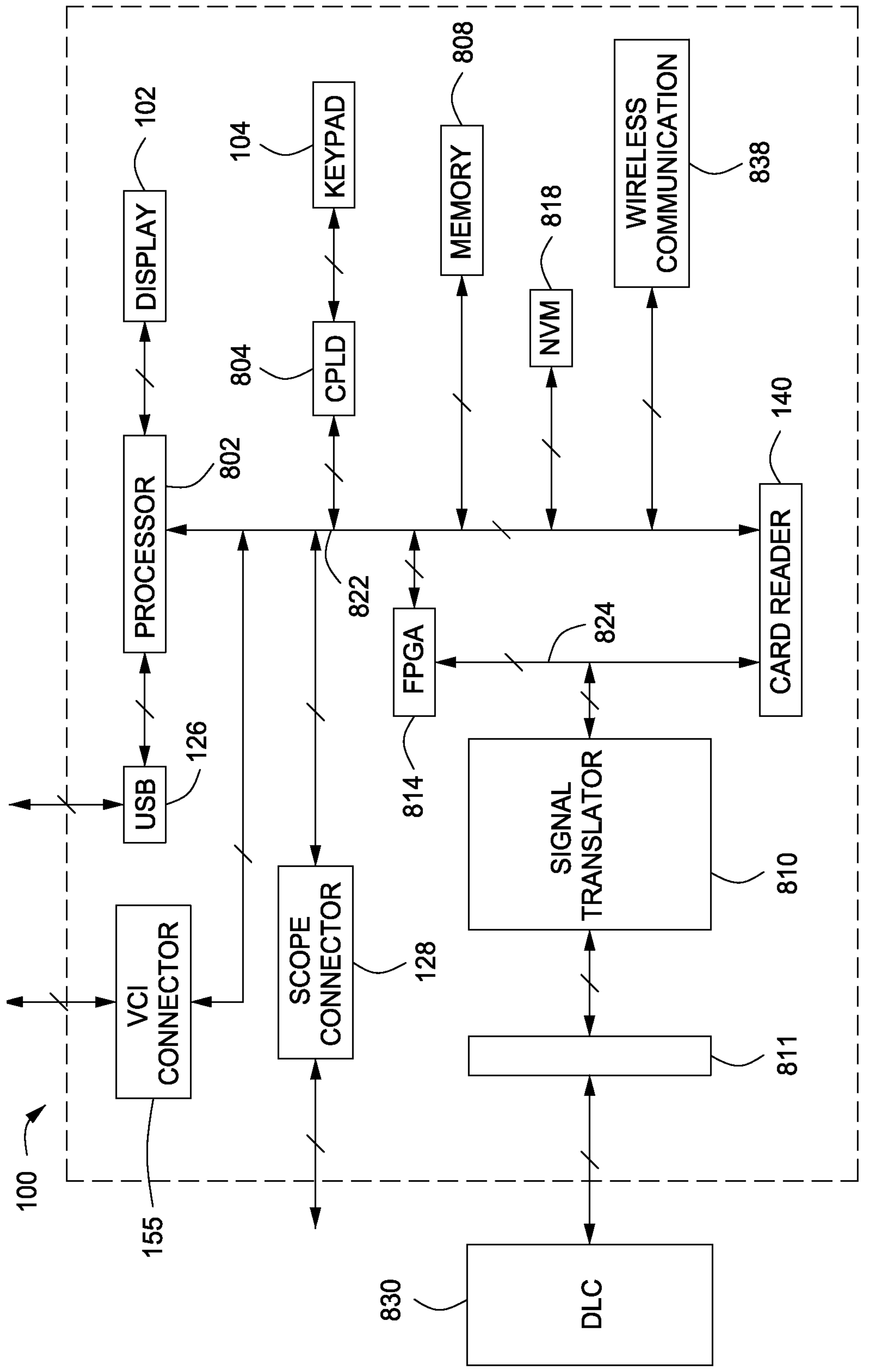
FIG. 8 is a block diagram of the components of the diagnostic tool according to an embodiment of the invention.

FIG. 8 is a block diagram of the components of the scan tool 100 according to an embodiment of the invention. In FIG. 8, the scan tool 100 according to an embodiment of the invention includes a processor 802, a field programmable gate array (FPGA) 814, a first system bus 824, the display 102, a complex programmable logic device (CPLD) 804, the user interface in the form of a keypad 104, a memory subsystem 808, an internal non-volatile memory (NVM) 818, a card reader 140, a second system bus 822, a connector interface 811, a selectable signal translator 810, a USB connector 126, and wireless communication circuit 838. The data link connector 830 can communicate with the scan tool 100 through connector interface 811 via an external cable (not shown). A scope connector 128 can communicate with an external scope (not shown) and a VCI connector 155 allows a wired communication with the VCI 200 (not shown).

Selectable signal translator 810 communicates with the vehicle communication interface 830 through the connector interface 811. Signal translator 810 conditions signals received from an ECU unit through the vehicle communication interface 830 to a conditioned signal compatible with scan tool 100. Signal translator 810 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4), OBD II or other communication protocols that are implemented in a vehicle.

The circuitry to translate and send in a particular communication protocol can be selected by FPGA 814 (e.g., by tri-stating unused transceivers) or by providing a keying device that plugs into the connector interface 811 that is provided by scan tool 100 to connect scan tool 100 to DLC 830. Signal translator 810 is also coupled to FPGA 814 and the card reader 140 via the first system bus 824. FPGA 814 transmits to and receives signals (i.e., messages) from the ECU unit through signal translator 810.

The FPGA 814 is coupled to the processor 802 through various address, data and control lines by the second system bus 822. FPGA 814 is also coupled to the card reader 140 through the first system bus 824. The processor 802 is also coupled to the display 102 in order to output the desired information to the user. The processor 802 communicates with the CPLD 804 through the second system bus 822. Additionally, the processor 802 is programmed to receive input from the user through the user interface 104 via the CPLD 804. The CPLD 804 provides logic for decoding various inputs from the user of scan tool 100 and also provides glue-logic for various other interfacing tasks.

Memory subsystem 808 and internal non-volatile memory 818 are coupled to the second system bus 822, which allows for communication with the processor 802 and FPGA 814. Memory subsystem 808 can include an application dependent amount of dynamic random access memory (DRAM), a hard drive, and/or read only memory (ROM). Software to run the scan tool 100 can be stored in the memory subsystem 808, including any database and diagnostic tests. The database and diagnostic tests can also be stored on an external memory, such as a compact flash card or other memories in the optional card reader.

Internal non-volatile memory 818 can be an electrically erasable programmable read-only memory (EEPROM), flash ROM, or other similar memory. Internal non-volatile memory 818 can provide, for example, storage for boot code, self-diagnostics, various drivers and space for FPGA images, if desired. If less than all of the modules are implemented in FPGA 814, memory 818 can contain downloadable images so that FPGA 814 can be reconfigured for a different group of communication protocols.

Wireless communication circuit 838 communicates with the processor 802 via second bus system 822. The wireless communication circuit 238 can be configured to communicate to RF (radio frequency), satellites, cellular phones (analog or digital), Bluetooth®, Wi-Fi, Infrared, Zigbee, Local Area Networks (LAN), WLAN (Wireless Local Area Network), or other wireless communication configurations and standards. The wireless communication circuit 838 allows the diagnostic tool to communicate with other devices wirelessly including the VCI 200. The wireless communication circuit 838 includes an antenna built therein and being housed within the housing or can be externally located on the housing.

The VCI connector 155 provides a wired connection between the scan tool 100 and the VCI 200. Via this connection 155, the scan tool can receive power from the VCI and vice versa. Additionally, via this connection 155, the scan tool and VCI can communicate with each other bi-directionally. The scope connector 128 provides a connection with an external scope.

Figure 9:
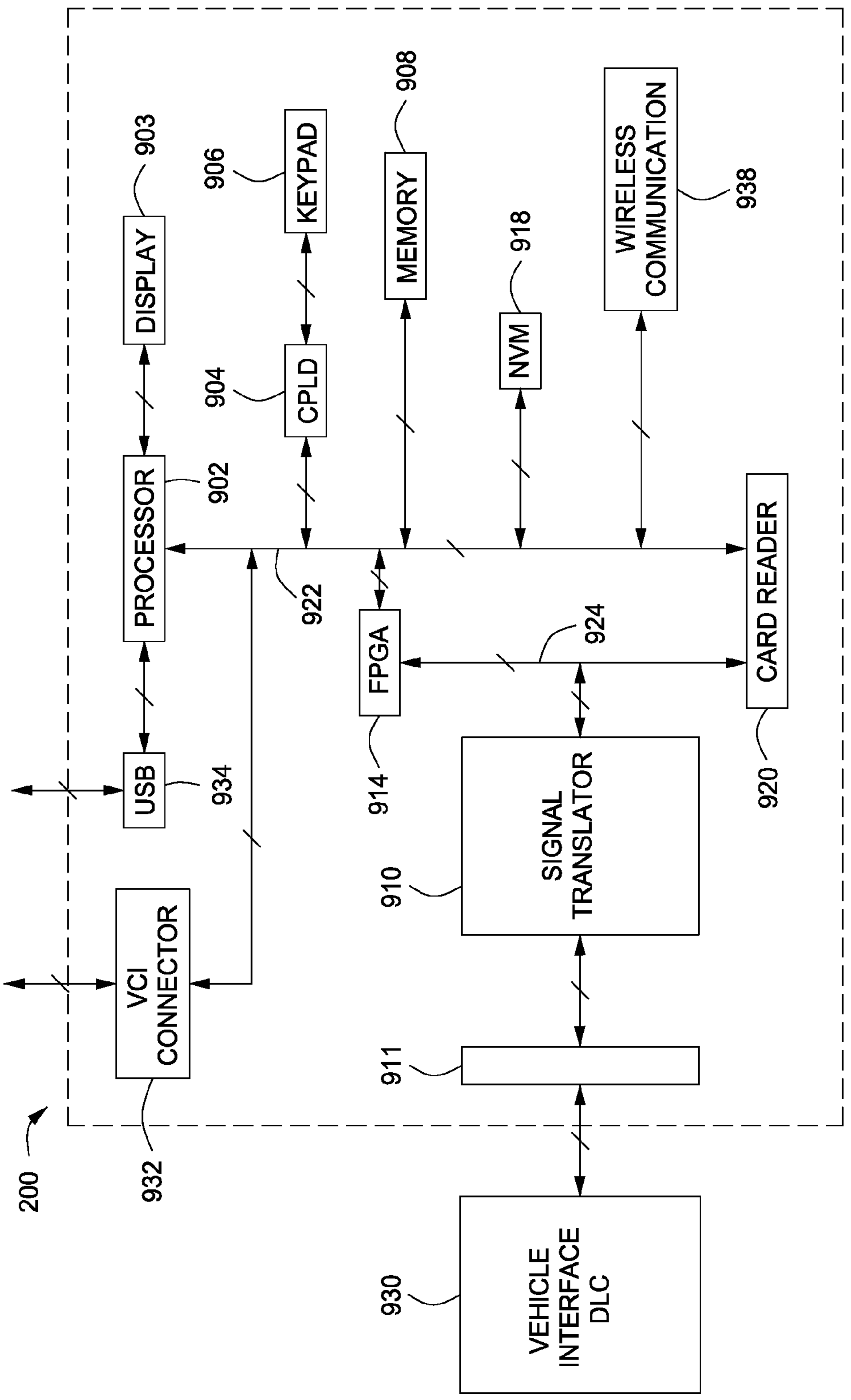
FIG. 9 is a block diagram of the components of the VCI according to an embodiment of the invention.

FIG. 9 is a block diagram of the components of the VCI 200 according to an embodiment of the invention. In FIG. 9, VCI 200 according to an embodiment of the invention includes a processor 902, a field programmable gate array (FPGA) 914 (optional), a first system bus 924, the display 903 (optional), a complex programmable logic device (CPLD) 904, the user interface in the form of a keypad 906, a memory subsystem 908, an internal non-volatile memory (NVM) 918, a card reader 920 (optional), a second system bus 922, a connector interface 911, a selectable signal translator 910, a USB connector 934, and wireless communication circuit 938. The data link connector 930 can be in communication with the VCI 200 through connector interface 911 via an external cable (not shown). A VCI connector 932 allows a wired connection with the scan tool 100.

Selectable signal translator 910 communicates with the DLC 930 through the connector interface 911. Signal translator 910 conditions signals received from an ECU unit through the DLC 930 to a conditioned signal compatible with the VCI 200. Signal translator 910 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4), OBD II or other communication protocols that are implemented in a vehicle.

The processor 902 is also coupled to the display 903 in order to output the desired information to the user. The processor 902 communicates with the CPLD 904 through the second system bus 922. Additionally, the processor 902 is programmed to receive input from the user through the user interface 906 via the CPLD 904.

The user interface 906 can include a scroll device that includes an "enter" button so that user can select the menu item, such as record data. The scroll device also includes a scroll wheel that can rotate around the "enter" button. The scroll wheel also includes up, down, left and right arrow controls. The scroll wheel allows the technician to move an indicator on the screen so that the information, such as menus can be scrolled and a selection on the screen can be made. The scroll wheel is configured for a fast response or fast scrolling. The scroll device can also include a scroll button, such as a "esc" button or any other button desired by the technician, such as a "back" or "forward" button. The scroll button including any components of the scroll device can be programmed for any desired functionality.

Memory subsystem 908 and internal non-volatile memory 918 are coupled to the second system bus 922, which allows for communication with the processor 902 and FPGA 914. Memory subsystem 908 can include an application dependent amount of dynamic random access memory (DRAM), a hard drive, and/or read only memory (ROM). Software to run the VCI 200 can be stored in the memory subsystem 908, including any database and diagnostic software. The database and diagnostic software can also be stored on an external memory, such as a compact flash card or other memories in the optional card reader.

Internal non-volatile memory 918 can be an electrically erasable programmable read-only memory (EEPROM), flash ROM, or other similar memory. Internal non-volatile memory 918 can provide, for example, storage for boot code, self-diagnostics, various drivers and space for FPGA images, if desired. If less than all of the modules are implemented in FPGA 914, memory 918 can contain downloadable images so that FPGA 914 can be reconfigured for a different group of communication protocols.

Wireless communication circuit 938 communicates with the processor via second bus system 922. The wireless communication circuit can be configured to communicate to RF (radio frequency), satellites, cellular phones (analog or digital), Bluetooth®, Wi-Fi, Infrared, Zigbee, Local Area Networks (LAN), WLAN (Wireless Local Area Network), or other wireless communication configurations and standards. The wireless communication circuit allows the VCI to communicate with other devices wirelessly, such as the scan tool 100. The wireless communication circuit includes an antenna built therein and being housed within the housing or can be externally located on the housing.

The VCI connector 932 provides a wired connection between the scan tool 100 and the VCI 200. Via this connection 932, the VCI can receive power from the scan tool and vice versa. Additionally, via this connection 932, the VCI and the scan tool can communicate with each other bi-directionally.

In operation, the VCI is coupled to the scan tool via the VCI connector on the scan tool. The VCI and the scan tool can communicate with each other on via the wired connection. Further, the VCI and the scan tool can provide each other power, as needed, via the wired connection. The VCI can also monitor the amount of current being drawn by the scan tool from the vehicle's battery and regulate the current being drawn as to prevent draining of the vehicle's battery. When the user wants to move around the vehicle with the scan tool, he can uncouple the VIC and the scan tool from each other. At this point, the scan tool will start drawing power from its internal battery. In other embodiments, the scan tool can receive power from a DC or AC source or even from the vehicle's battery. These are but examples of power sources as there are many others that are contemplated by the invention. Once the wired connection is broken, the VCI and scan tool will communicate wirelessly and no communication is interrupted going from the wired connection to the wireless connection. The user can also then couple the VCI and scan tool together to form the wired connection. In this case, the VCI and the scan tool will communicate via the wired connection and power can be drawn from each other as needed (as explained herein). Again, no communication is interrupted going from the wireless connection to the wired connection. In other words, going from a wired to a wireless connection and vice versa will be seamless and the communication between the VCI and the scan tool will be uninterrupted.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A portable diagnostic system for a vehicle, comprising:

a vehicle communication interface (VCI) configured to communicate with a data link connector on the vehicle and to receive diagnostic data from the vehicle; and a diagnostic tool configured to receive diagnostic data from the VCI via a wired or a wireless connection, wherein when using the wired connection the diagnostic tool and the VCI are configured to provide power to each other and communicate with each other through the wired connection, wherein when the diagnostic tool and the VCI are disconnected from the wired connection, the diagnostic tool and the VCI are configured to continue to communicate with each other using the wireless connection and further configured to transition from the wired connection to the wireless connection without having to reboot the diagnostic tool or the VCI.

2. The diagnostic system of claim 1, wherein the VCI receives power from a vehicle's battery and provides the power to the wire connected diagnostic tool.

3. The diagnostic system of claim 1, wherein when the diagnostic tool and the VCI are connected wirelessly, the diagnostic tool receives power from an electrical outlet.

4. The diagnostic system of claim 1, wherein when the diagnostic tool and the VCI are connected wirelessly, the diagnostic tool receives power from a vehicle's battery.

5. The diagnostic system of claim 3, wherein the diagnostic tool balances the power from the VCI and the electrical outlet so as to not drain the VCI's power source.

6. The diagnostic system of claim 1, wherein when the diagnostic tool and the VCI are firstly communicating wirelessly, then when the VCI is coupled with the diagnostic tool through the wired connection, the diagnostic tool and the VCI communicate secondly with each other through the wired connection without having to reboot the diagnostic tool or the VCI.

7. The diagnostic system of claim 2 further comprising a power controller switch that in a first position allows the diagnostic tool to draw power from the vehicle's battery and in a second position does not allow the diagnostic tool to draw power from the vehicle's battery.

8. The diagnostic system of claim 1, wherein the VCI is received within a VCI connection portion of the diagnostic tool so that it is transported with the diagnostic tool.

9. The diagnostic system of claim 1, wherein the wired connection is through a VCI connection portion on the diagnostic tool, the VCI connection portion includes a current sensing circuit to sense an amount of current being drawn from a vehicle's battery by the diagnostic tool.

10. The diagnostic system of claim 9 further comprising a power controller switch that in a first position allows the diagnostic tool to draw power from the vehicle's battery and in a second position does not allow the diagnostic tool to draw power from the vehicle's battery when the current sensing circuit senses that the current being drawn exceeds a predetermined amount.

11. The diagnostic system of claim 1, wherein when the VCI and diagnostic tool's wired connection is switched to the wireless connection, the communication between the VCI and diagnostic tool remains uninterrupted.

12. The diagnostic system of claim 6, wherein when the VCI and diagnostic's wireless connection is switched to the wired connection, the communication between the VCI and diagnostic tool remains uninterrupted.

13. A vehicle communication interface (VCI) that links with a vehicle to collect vehicle diagnostic data, comprising:

a processor that processes the vehicle diagnostic data;

a signal translator that translates a vehicle communication protocol;

a memory that stores the vehicle diagnostic data;

a wireless communication interface configured to allow wireless communication with a diagnostic tool;

a first connector that connects to a data link connector on the vehicle to receive the vehicle diagnostic data; and a second connector that allows the VCI to connect to the diagnostic tool, wherein when the VCI is connected to and communicating with the diagnostic tool via the second connector and then disconnected from diagnostic tool, the VCI will continue to communicate with the diagnostic tool via a wireless connection.

14. The vehicle communication interface of claim 13, wherein the VCI further receives power transmitted through an electric node connected to a battery, a reverse current protection diode, and a current limiting resistor.

15. The vehicle communication interface of claim 13 further comprising a complex programmable logic device configured to communicate with the processor and a current sensing circuit on the diagnostic tool, wherein the logic device monitors an amount of current being drawn by the diagnostic tool.

16. The vehicle communication interface of claim 15, wherein the complex programmable logic device cuts off the current being drawn by the diagnostic tool from the vehicle's battery when the current being drawn exceeds a predetermined level.

17. The vehicle communication interface of claim 13, wherein when the VCI and diagnostic tool's wired connection is switched to the wireless connection, the communication between the VCI and diagnostic tool remains uninterrupted.

18. The vehicle communication interface of claim 13, wherein when the diagnostic tool and the VCI are firstly communicating wirelessly, then when the VCI is coupled with the diagnostic tool through the wired connection, the diagnostic tool and the VCI communicate secondly with each other through the wired connection without having to reboot the diagnostic tool or the VCI.

19. The vehicle communication interface of claim 18, wherein when the VCI and diagnostic's wireless connection is switched to the wired connection, the communication between the VCI and diagnostic tool remains uninterrupted.

20. A method of communicating between a vehicle communication interface (VCI) and a vehicle diagnostic tool, comprising the steps of:

connecting the VCI with the vehicle diagnostic tool through a VCI connector interface on the vehicle diagnostic tool;

receiving vehicle diagnostic data from the vehicle by the VCI;

communicating the vehicle diagnostic data from the VCI to the vehicle diagnostic tool;

providing power as needed from the VCI to the vehicle diagnostic tool and vice versa; and maintaining uninterrupted communication via a wireless connection between the VCI and the scan tool when the VCI is disconnected from the vehicle diagnostic tool.

21. The method of communicating of claim 20 further comprising the step of maintaining uninterrupted wired communication between the VCI and vehicle diagnostic scan tool when the VCI is connected back to the vehicle diagnostic tool.

* * * * *